United States Patent Office 3,090,762
Patented May 21, 1963

3,090,762
AQUEOUS COATING AND IMPREGNATING PREPARATIONS COMPRISING ACRYLIC RESINS
Arthur Maeder, Therwil, and Georg Sulzer, Basel, Switzerland, assignors to Ciba Limited, Basel, Switzerland
No Drawing. Filed Sept. 10, 1959, Ser. No. 839,055
Claims priority, application Switzerland Aug. 2, 1957
5 Claims. (Cl. 260—21)

The present invention relates to coating and impregnating preparations, especially for dyeing with pigments, and is a continuation-in-part of application Ser. No. 749,604, filed July 21, 1958 (now abandoned).

It is known to use acrylic resins for the production of coatings and impregnations on fibrous and filmlike materials. They have found special importance as binding agents for the production of dyeings and prints with pigments. For this purpose high demands are generally placed on the properties of fastness of the dyeings and prints. Thus, the dyeings must possess a good fastness to rubbing, wahing and light. It has been found that in many cases the fastness to light of a dyeing is distinctly reduced by exposure to light as compared with that of the dyeing before exposure to light. This fastness to washing of a dyeing that has been exposed to light is hereinafter referred to as "light-fastness to washing."

The present invention is based on the observation that those copolymers of the acrylic series possess an improved light-fastness to washing which are built up from at least 25 percent by weight of an ester of the general formula

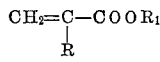

in which R represents a hydrogen atom or an alkyl group containing 1 to 4 carbon atoms, and $R_1$ represents the radical of a saturated carbocyclic alcohol, containing from 6 to 12 carbon atoms, and 0.2 to 10 percent by weight of an acid of the general formula

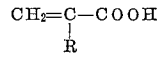

in which R has the meaning given above, and of which the remainder up to 100 percent by weight of the monomers consists of an ester of the general formula

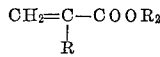

in which R has the meaning given above, and $R_2$ represents an alkyl group which may be interrupted by an ether-oxygen atom and contains 1 to 18 carbon atoms.

Accordingly, the invention includes copolymers of the above constitution and their use as coating or impregnating agents, especially as binding agents for dyeing or printing with pigments.

In the above general formulae R preferably represents a hydrogen atom or an alkyl group advantageously containing 1 to 4 carbon atoms, such as the ethyl group and especially the methyl group. $R_1$ represents the radical of a saturated carbocyclic alcohol of the formula $R_1$—OH, which contains 6 to 12 carbon atoms. There may be mentioned, for example, cyclohexanol, alkoxy- or alkyl-cyclohexanols, such as ortho-methyl-cyclohexanol, para-methoxy-cyclohexanol, and also decahydronaphthols and terpene alcohols, such as isoborneol.

The radical $R_2$ represents the radical of a saturated aliphatic alcohol of the formula $R_2$—OH containing 1 to 18 carbon atoms, and of which the alkyl group may have a straight or branched chain and may be interrupted by an ether-oxygen atom. There may be mentioned methyl, ethyl, propyl, isopropyl, n-butyl, isobutyl, tertiary butyl, amyl, 2-ethyl-butyl, n-hexyl, heptyl, 2-ethyl-hexyl, dodecyl, octadecenyl and octadecyl alcohol, and also methoxy-ethanol, ethoxy-ethanol, butoxy-ethanol and butoxy-butanol.

The esters of the alcohols of the formulae $R_1$—OH and $R_2$—OH are those of α-alkyl-acrylic acids, such as methacrylic acid, and advantageously acrylic acid. All the esters in a single copolymer may be derived from the same or different acids. Thus, for example, methacrylic acid cyclohexyl ester may be combined with ethyl acrylate or acrylic acid isobornyl ester with n-hexyl methacrylate. Furthermore, there may be present in a single copolymer more than one member of the same type of ester.

The production of the copolymer may be carried out by applying polymerization means known per se. It is of advantage to conduct the polymerization in solution and especially in emulsion. Emulsion polymerization is of great advantage in that readily usable coating and impregnating preparations can easily be prepared from copolymers obtained in this manner. The emulsion polymerization is advantageously carried out with the use of a catalyst and in the presence of an emulsifying agent.

As emulsifying agents for emulsifying the starting materials there may be used those which possess an adequate stability in acid media, for example, acid sulfuric acid esters of fatty alcohols, sulfonated castor oil, higher alkyl sulfonates, higher oxyalkyl sulfonates, especially sodium α-oxyoctadecane sulfonate, and advantageously one which is free from other salts; sulfo-dicarboxylic acid esters, for example, the sodium salt of sulfo-succinic acid dioctyl ester, higher alkyl-aryl sulfonates, and also polyglycol ethers of fatty alcohols of high molecular weight, such as cetyl, oleyl or octadecyl alcohol, for example, reaction products of 15 to 30 mols of ethylene oxide per mol of fatty alcohol. There may also be used emulsifying agents having a pronounced wetting action, such as octyl-phenol polyglycol ethers and their acid sulfuric acid esters, and also dodecyl alcohol polyglycol ethers. There may also be used mixtures of such emulsifying agents, and mixtures thereof with protective colloids, such as esters of alginic acid, polyvinyl alcohols, partially hydrolyzed polyvinyl esters, proteins, starches and starch derivatives, but preferably such protective colloids are not added, since their presence generally impairs the film-forming properties of the copolymers.

As catalysts for the polymerization the usual compounds used for catalysing polymerizations may be used, such as organic or inorganic peroxides or per-salts, for example, per-acetic acid, acetyl peroxide, benzoyl peroxide, benzoyl-acetyl peroxide, lauroyl peroxide, hydrogen peroxide, percarbonates, persulfates or perborates. The proportion of catalyst added is determined in known manner depending on the course of reaction desired or on the properties desired in the copolymer. If desired, a plurality of agents catalysing the polymerization may be used. The action of the polymerization catalysts may be enhanced by the action of heat and/or actinic rays. The polymerization may be carried out with the aid of heat and/or actinic rays, without the addition of a catalyst.

The dispersions of copolymers of this invention have an acid reaction and are generally thinly liquid. Dispersions of suitable concentration can be converted into salve-like or paste-like compositions, by complete or partial neutralization, advantageously with a concentrated aqueous solution of ammonia.

The emulsions of the copolymers are very stable whether they are rendered acid or alkaline, and can therefore be used either in thinly liquid form or in a salve-like or paste-like condition. Furthermore numerous organic or inorganic pigments or filling materials may be mixed with the dispersions. When such pigments or filling materials are used the thickening may be brought about after they have been added, and this facilitates the use of the emulsions and widens their range of application. Further modifying substances, such as plasticizers, for example, dibutylphthalate or dioctyl phthalate, or sebacic acid esters may also be added.

The polymerization products are especially suitable for the manufacture of elastic coatings of good adhesion on fabrics of all kinds, for example, cotton, jute, hemp, straw, artificial silk, neutral silk, nylon, "Orlon" or glass fabrics or fabrics of staple fibers of regenerated cellulose. It may sometimes be desirable to thicken the dispersion with ammonia, and to apply it to a fabric or paper by means of a spreading machine operating with a doctor. In this manner there can be made from the new products, for example, water-proof raincoat materials, imitation leather cloth or oilcloth, tent material, oiled silk cloth and dressings for the back of velveteen or carpets. By virtue of their good adhesion these resins are also suitable as priming agents below polyvinyl chloride coatings, for example, for the production of artificial leather, and also as binding agents for coating colors on leather.

The new dispersions can also be used in the unthickened condition in immersion processes for the production of filling finishes on fabrics of all kinds. In this manner, for example, bed ticking, materials having wash-resistant dressings to improve the feel, water-resistant tent cloths and also interlining materials can be made which are resistant to dry cleaning and are not brittle. Further uses for the new products are in sticking polyvinyl chloride foils or other artificial resin foils, and also for sticking paper sheets or metal sheets to themselves or paper sheets to metal sheets and also for covering glass or cloth fabrics of all kinds.

As stated above the copolymers of this invention are especially suitable as binding agents for producing pigment dyeings or pigment prints on textile materials of all kinds. For this purpose they may be used alone. When dyeings or prints having very good properties of fastness are desired, it is of advantage to use the copolymers together with aminoplasts. As an aminoplast there may be used an aqueous dispersion of a condensation product, which is insoluble in water but soluble in organic solvents, of formaldehyde with an amino-compound capable of forming a hardenable resin with formaldehyde, or there may be used a water-soluble condensation product of formaldehyde with an amino-compound capable of forming a hardenable resin with formaldehyde or a water-soluble derivative of such amino-compound. Very good results are obtained by using these two types of resin together. An advantageous way of carrying out a pigment dyeing process is to apply to the fibrous material or material in the form of a film an aqueous preparation which contains, in addition to a pigment, the following components as binding agents:

(A) A dispersion of a copolymer of the acrylic series as defined above,
(B) An aqueous dispersion of a water-insoluble derivative, soluble in organic solvents, of a condensation product of formaldehyde with an aminotriazine or urea compound,
(C) A water-soluble condensation product of formaldehyde with an aminotriazine or urea compound, or a water-soluble ether of such condensation products, and, after drying the material, to harden the resin thereon.

There may be used as binding agents a two-component system consisting of components (A) and (B) or (A) and (C) or a three-component system consisting of components (A), (B) and (C).

The derivative, which is insoluble in water and soluble in organic solvents, used as component (B) above is used in the form of a dispersion like component (A). These derivatives may be derived, on the one hand, from condensation products of formaldehyde with urea, thiourea, guanidine, acetylene-diurea, dicyandiamide, uron, or an aminotriazine such as melamine, or a guanamine such as acetoguanamine, benzoguanamine or formoguanamine, and, on the other, from alcohols containing at least three carbon atoms such as propyl alcohol, butyl alcohol, amyl alcohol, hexyl alcohol, cyclohexanol, benzyl alcohol, dodecyl alcohol, oleyl alcohol or abietyl alcohol. In addition to the ether radicals the condensation products may also contain the radicals of acids of high molecular weight, for example, stearic acid. When acid radicals of high molecular weight are present, the products may be methylol ethers of alcohols containing one or two carbon atoms.

Methods for making such condensation products are known. It is also known how to make the dispersions with emulsifying agents and protective colloids, such as casein or gelatine. Especially suitable are ethylene oxide condensation products of alcohols, acids or amines of high molecular weight, for example, oleyl alcohol, octadecyl alcohol or hydroabietyl alcohol. In the manufacture of dispersions it may be of advantage to remove any solvent which results from the method of preparation of the condensation product.

The water-soluble formaldehyde condensation products used as components (C) are derived from the amino-compounds mentioned in connection with the components under (B). Instead of the free methylol compounds there may be used the water-soluble ethers thereof with alcohols of low molecular weight, such as methanol or ethanol.

The compositions of this invention may contain more than one component belonging to any one of the types of components (A), (B) and (C). The relative proportions of the components may vary within wide limits.

Advantageously there are used when only components (A) and (B) are applied per 100 parts of component (A) 1 to 400 parts of component (B), when components (A) and (C) are applied per 100 parts of component (A) 5 to 100 parts of component (C), and when components (A), (B) and (C) are applied per 100 parts of component (A) 1 to 400 parts of component (B) and 5 to 100 parts of component (C); the parts being by weight and calculated on the dry content of the components.

When the compositions of this invention which are made up from two or three components, and the composition is to be stored, the acid groups present in component (A) must be neutralized. This is not necessary when the composition is to be used immediately. For use there is advantageously added a hardening catalyst, for example, an acid or a compound liberating acid at a raised temperature, for example, an ammonium salt of a strong acid. The hardening is carried out under the usual conditions, for example, at 120–160° C. for 2–10 minutes. The compositions may be applied to fibrous materials in known manner, for example, by impregnation or printing. Instead of applying to the fibrous materials or films compositions which contain a pigment, materials that have been colored with a pigment may be after-treated with the binding composition.

The fibrous materials to be treated in the process of this invention are more especially fabrics of natural or regenerated cellulose, such as cotton linen, artificial silk or staple fibers of regenerated cellulose, or cellulose esters, such as cellulose acetate artificial silk, wool, natural silk or synthetic fibrous materials, such as polyamide, polyester or polyacrylonitrile fibers, or glass fibers. Equally suitable are textile materials containing mixtures of these fibers.

The following examples illustrate the invention, the parts being by weight unless otherwise stated, and the relationship of parts by weight to parts by volume being the same as that of the kilogram to the liter:

*Example 1*

0.5 part of triethanolamine, 0.2 part of isooctanol and 6.25 parts of acrylic acid of 100% strength are added to a solution of 3.75 parts of sodium α-hydroxyoctadecane sulfonate in 120 parts of distilled water. A mixture of 75 parts of isobornylacrylate and 43.75 parts of β-butoxyethyl acrylate is run in slowly at 20–25° C., while stirring vigorously, whereby an emulsion is formed.

One half of this emulsion is heated to 65° C. in a polymerization vessel provided with a reflux condenser, while stirring and under nitrogen, and then 1.25 parts by volume of an aqueous solution of 10% strength of potassium persulfate are added. When the polymerization has commenced, the other half of the emulsion, to which 2.5 parts by volume of an aqueous solution of 10% strength of potassium persulfate have been added, is run in in the course of 25 minutes. Due to the liberation of reaction heat the temperature gradually rises to about 95° C.

When the addition of the monomer emulsion is complete, a further 1.25 parts by volume of an aqueous solution of 10% strength of potassium persulfate are added, and the polymerization is completed in a further 90 minutes at about 70° C.

There are obtained 254 parts of a stable finely divided emulsion of the copolymer, which has a dry content of 50.2%. By filtering the emulsion through a fine wire gauze the emulsion is freed from traces of coagulate, which forms during the polymerization. When applied to a glass plate this emulsion, after drying, yields a glossy completely colorless and firmly adherent film.

The emulsion can be used as follows:

(A) 120 parts of Turkey red oil, 26 parts of triethanolamine, 62 parts of water and 431 parts of an allyl ether of hexamethylol-melamine esterified with soya bean fatty acid are mixed together in a homogenizer, and homogenized until a highly dispersed syrupy emulsion is obtained. With the latter are mixed 861 parts of the copolymer latex obtained as described in the first three paragraphs of this Example, and the whole is homogenized for a short time. There are obtained 1500 parts of an emulsion having a viscous consistency, which has a dry content of 67% and a pH value of 7.5.

A dyebath is then prepared containing, per liter, 15 grams of the non-neutralized copolymer latex described in the first three paragraphs of this Example, 10 grams of a water-soluble methyl ether of a urea-formaldehyde condensation product containing, per mol of urea, more than 2 mols of formaldehyde, 30 grams of the emulsion described above, 30 grams of sodium alginate (30:1000), 2 grams of a concentrated aqueous solution of ammonia, and 5 grams of ammonium sulfate.

In addition to the above constituents the dyebath contains as pigment one of the following dyestuff pastes:

(a) 11 grams of a paste containing 15% of dibromanthanthrone, (b) 3 grams of a paste containing 15% of copper phthalocyanine, (c) 7 grams of a paste containing 12% of isoviolanthrone, (d) 14 grams of a paste containing 13% of the dyestuff of the formula

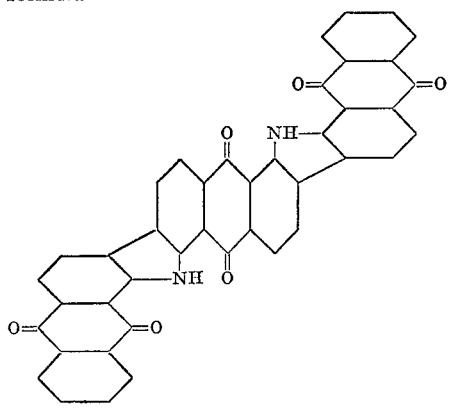

Bleached mercerized cotton poplin is introduced at room temperature into the above dye liquor, then squezed on a foulard to a weight increase of 65–80%, dried at 70–90° C., and then hardened at 145–150° C. for 5 minutes.

The dyeings produced as described above posses a very good fastness to scrubbing, washing and rubbing. Furthermore, they possess a good light-fastnes to washing, i.e. fastness to washing when they are washed at the boil with soap and soda, after being exposed to light for 90 hours in a fadeometer. The fastness to washing is as good as that of the control dyeing not exposed to light. In this Example the ratio between the binders is per 100 parts of component (A), about 50 parts of component (B) and about 60 parts of component (C), the parts being by weight calculated on the dry content of the components.

(B) 109.5 parts of Turkey red oil, 6.5 parts of triethanolamine, 73.8 parts of water and 524.2 parts of a solution of 75% strength of a dimethylol-ureabutyl ether in butanol are mixed together in a homogenizer as described under A and, after the homogenization, there are added to the mixture 786 parts of the copolymer latex of 50% strength obtained as described in the first three paragraphs of this example and 200 parts of water.

There are obtained 1700 parts of a slightly syrupy finely divided emulsion, having a dry content of 53% and a pH value of 7.2.

A dyebath is prepared in the manner described under (A), except that, instead of the emulsion binding agent described in the first paragraph of (A), there are used 33 grams of the emulsion described in the first paragraph under (B).

In addition to having a good fastness to washing, scrubbing and rubbing, dyeings produced with the above binding agent possess a good light-fastness to washing.

In this example the ratio between the components is per 100 parts of component (A) about 50 parts of component (B) and about 65 parts of component (C), the parts being by weight calculated on the dry content of the components.

*Example 2*

90 parts of cyclohexyl acrylate and 52.5 parts of β-butoxyethylacrylate are emulsified in the manner described in Example 1 in a mixture of 4.5 parts of sodium α-hydroxy-octadecane sulfonate, 0.6 part of triethanolamine, 0.25 part of isooctanol, 7.5 parts of acrylic acid and 140 parts of water and polymerized.

There are obtained 304 parts of a very fine stable emulsion having a dry content of about 50%, which can be used in the following manner:

(C) 120 parts of Turkey red oil, 26 parts of triethanolamine, 62 parts of water and 431 parts of an allyl ether of hexamethylol-melamine esterified with soya bean fatty acid are mixed in a homogenizer as described in Example 1 under (A), and, after being homogenized, there are added to the mixture a further 861 parts of the copolymer latex of 50% strength described in the first paragraph of this example, and the whole is homogenized for a short time.

There are obtained 1500 parts of a viscous pure finely divided emulsion having a dry content of 67% and a pH value of 7.5.

A dyebath is prepared which contains, per liter, 15 grams of the copolymer latex which has not been neutralized and is prepared as described in the first paragraph of this xample, 10 grams of a water-soluble methyl ether of a urea-formaldehyde condensation product containing more than 2 mols of formaldehyde cndensed with 1 mol of urea, 30 grams of the emulsion described in the first pargraph under (C), 30 grams of sodium alginate (30:1000), 2 grams of concentrated ammonia solution and 5 grams of ammonium sulfate.

In addition to the above constituents, there is added to the dyebath one of the pigment pastes mentioned under (A) in Example 1.

Bleached mercerized cotton poplin is impregnated in the manner described in Example 1, dried and hardening is carried out.

On the cotton fabric so treated there is produced a dyeing which is very fast to light and fast to washing and also fast to scrubbing and rubbing.

Instead of the water-soluble binding agent mentioned, the same quantity of a known water-soluble formaldehyde condensation product of melamine, acetoguanamine, dicyandiamide, or acetylenediurea can be used.

*Example 3*

In the manner described in Example 1 a copolymer is prepared in aqueous emulsion from 45 parts of isobornyl acrylate, 97.5 parts of β-butoxyethyl acrylate and 7.5 parts of acrylic acid with the use of 4.5 parts of sodium α-hydroxy-octadecane sulfonate, 0.6 part of triethanolamine, 0.25 part of isooctanol and 140 parts of water.

The resulting emulsion can be worked up in the manner described under (A) in Example 1 by using, instead of the copolymer latex used in that example, 861 parts of the above latex and otherwise proceeding in the same manner.

With this binding composition there are obtained dyeings having substantially better light-fastness to washing than those which have been made with copolymer latices containing no acrylate of a cyclic alcohol.

By using in the foregoing examples for preparing the mixture of a water-insoluble melamine resin and the copolymer latices, instead of the said melamine resin, n-propyl ether, butyl ether or isobutyl ether of hexamethylol melamine, and using the resulting composition for making up the dyebath, there are obtained dyeings having the same good properties of fastness.

Instead of three binding agents as described under (A) in Example 1, there may be used one or two binding agents as follows:

(D) A dyebath is prepared, containing per liter, 20 grams of the copolymer latex described in Example 1, 30 grams of alginate thickening (30:1000), 3 grams of a pigment paste constaining 15% of copper phthalocyanine, 2 grams of concentrated ammonia solution, and 5 grams of ammonium sulfate.

Mercerized bleached cotton poplin is introduced at room temperature into the dye liquor, and the material is squeezed on a foulard to a weight increase of 60–70%, then the material is dried at 70–90° C. and hardening is carried out for 5 minutes at 145–150° C.

Instead of the copolymer latex in Example 1 there may be used the latex described in Example 2. Instead of the dyestuff mentioned above there may be used any of the others mentioned in Example 1 under (A).

(E) The procedure is the same as described under (D), except that a further 10 grams of a water-soluble methyl ether of a urea-formaldehyde condensation product, which contains per mol of urea more than 2 mols of formaldehyde, are added to the dyebath.

(F) A dyebath is prepared containing, per liter, 45 grams of the dispersion of melamine resin and acrylic copolymer described in Example 2 in the first paragraph under (C), 30 grams of alginate thickening (30:1000), 3 grams of pigment paste containing 15% of copper phthalocyanine, 2 grams of concentrated ammonia solution and 5 grams of ammonium sulfate.

Mercerized bleached cotton poplin is introduced at room temperature into the above dye liquor, and the material is squeezed on a foulard to a weight increase of 60–70%, then dried at 70–90° C. and hardening is carried out for 5 minutes at 145–150° C.

A dyeing of very good fastness to light and washing is obtained.

Instead of the dispersion mentioned in the first paragraph under (C) in Example 2 there may be used the same quantity of the dispersion described in the first paragraph under (A) in Example 1, and in this manner very good properties of fastness to light and washing are likewise obtained.

*Example 4*

To a solution of 34 parts of sodium α-hydroxy-octadecane sulfonate in 1600 parts of distilled water to which 45 parts of acrylic acid of 100% strength, 3.6 parts of triethanolamine and 1.4 parts of iso-octanol have been added, there are added with vigorous stirring 385.6 parts of methyl-cyclohexylacrylate, the latter having been prepared by esterifying industrial methyl-cyclohexanol (mixture of isomers) which has the following specifications: $d_4^{20°}$ 0.9210, $n_{D20°}$, 1.4593, 95% distil at 165.6–190° C., and 270 parts of n-butylacrylate. This emulsion is heated with stirring and under nitrogen at 70° C.

A solution of 10.8 parts of potassium persulfate in 216 grams of distilled water and a solution of 5.4 parts of sodium hydrogen sulfite (58.7% strength) in 60 parts of distilled water are prepared separately. A sixth part of the catalyst solution and a sixth part of the activator solution are added to the above described emulsion to initiate polymerization.

When the polymerization has begun, a further monomeric emulsion is added in the course of 2½ hours. This emulsion consists of 1757.4 parts of methylcyclohexylacrylate and 810 parts of n-butylacrylate emulsified in a solution of 34 parts of sodium α-hydroxydecane sulfonate, 10.8 parts of triethanolamine, 135 parts of acrylic acid and 4.2 parts of iso-octanol in 1600 parts of distilled water.

The remainder of the catalyst and activator solutions is added in the course of polymerization in portions of one sixth each.

There are obtained 6750 parts of a stable latex of the copolymer which has a dry content of 50.1%. The emulsion is pressed through a fine cloth filter to remove traces of coarser resin constituents. The emulsion has a pH value of 3.2 and, after being applied to a glass plate and drying yields a completely colorless, glossy, flexible and very firmly adherent waterfast film.

In a homogenizer there are mixed 160 parts of Turkey red oil, 34 parts of triethanolamine, 77.5 parts of distilled water and 596.5 parts of commercial methylolmelamine butyl ether of 95% strength and homogenized until a highly dispersed syrupy emulsion is obtained. With the latter are mixed 1132 parts of the above described copolymer latex, and the whole is homogenized for a short time. There are obtained 2000 parts of an emulsion having a viscous consistency which has a dry content of 66.3% and a pH value of 7.7.

The above described mixture can be used in preparing a dyebath as mentioned in Example 1, paragraph (A) or Example 3(F).

If in the preparation of the copolymer the methylcyclohexylacrylate is replaced by the same quantity of cyclohexylacrylate a copolymer is produced which is also very suitable for a combination with aminoplast resins. When such combinations are used as binding agents for pigment dyeings, good fastness to light and washing is obtained.

*Example 5*

The procedure is the same as described in Example 1A, 1B, 2C, 3E or 3F but the dyebaths are not used for dyeing cotton but for dyeing artificial silk or staple fibers of regenerated cellulose, or cellulose esters, such as cellulose acetate artificial silk, wool, natural silk or synthetic fibrous materials, such as polyamide, polyester or polyacrylonitrile fibers.

*Example 6*

Cotton poplin is dyed on a foulard in a bath which contains per liter, 10 grams of a micro-dispersed paste of copper phthalocyanine, 0.5 gram of sodium cellulose-glycollate and 15 cc. of formic acid of 85 percent strength.

After squeezing the material it is dried. The dyed fabric is then after-treated on a foulard in a bath which contains, per liter, 15 grams of the non-neutralized copolymer latex described in Example 3, 5 grams of an emulsion of 70 percent strength of a methylol-melamine allyl ether modified with soya bean fatty acid, with the use of Turkey red oil as emulsifying agent, 35 grams of a water-soluble methyl ether of a urea-formaldehyde condensation product which contains more than two mols of condensed formaldehyde per mol of urea, and 2 cc. of formic acid of 85 percent strength.

After being dried at 80° C. and hardened at 140° C. for 5 minutes, the material has the dyeing fixed thereon fast to washing. If the after-treatment of the dyeing is carried out without the addition of the emulsion of the methylolmelamine allyl ether, the fastness to washing of the dyeing is considerably weaker.

*Example 7*

A cotton fabric is printed with a printing paste containing, per kilogram,

- 60 grams of a red pigment dyestuff
- 9 grams of an emulsion of 36% strength of methylolmelamine butyl ether
- 5 grams of an emulsion of 70% strength of a methylolmelamine allyl ether modified with soya bean fatty acid, with the use of Turkey red oil as emulsifier
- 9 grams of a copolymer latex of 40 percent strength prepared from 55 parts of butadiene and 45 parts of acrylonitrile
- 14 grams of the non-neutralized copolymer latex described in Example 2
- 5 grams of a water-soluble methyl ether of a urea-formaldehyde condensation product containing more than 2 mols of condensed formaldehyde per mol of urea
- 4 grams of a mixture of 40 percent of potassium oleate and 60 percent of pine oil
- 30 grams of ammonium thiocyanate solution 1:1
- 864 grams of a petroleum emulsion as thickener 1000 grams.

The print is fixed and hardened in the usual manner. The print has a very good fastness to washing and rubbing, and no bleeding into the white ground takes place.

What is claimed is:

1. A process for dyeing and printing fibrous textile fabric with pigments, which comprises contacting the fabric with an aqueous composition of matter which contains a dispersed pigment and the following compounds as pigment-binders:
    (A) an aqueous dispersion of a copolymer consisting of 60 percent by weight of isobornyl acrylate, 35 percent by weight of β-butoxy ethyl acrylate and 5 percent by weight of acrylic acid,
    (B) an aqueous dispersion of hexamethylolmelamine allyl ether esterified with soya bean fatty acid, and
    (C) a water-soluble methyl ether of a urea-formaldehyde condensation product containing per mol of urea more than 2 mols of formaldehyde, drying the material and heating to harden the composition applied; the components being used in the following proportions the parts being by weight calculated on the dry content of the components: per 100 parts of component (A) about 50 parts of component (B) and about 60 parts of component (C).

2. A process for dyeing and printing fibrous textile fabric with pigments, which comprises contacting the fabric with an aqueous composition of matter which contains a dispersed pigment and the following compounds as pigment-binders:
    (A) an aqueous dispersion of a copolymer consisting of 60 percent by weight of cyclohexyl acrylate, 35 percent by weight of β-butoxy ethyl acrylate and 5 percent by weight of acrylic acid,
    (B) an aqueous dispersion of hexamethylolmelamine allyl ether esterified with soya bean fatty acid, and
    (C) a water-soluble methyl ether of a urea-formaldehyde condensation product containing per mol of urea more than 2 mols of formaldehyde, drying the material and heating to harden the composition applied, the components being used in the following proportions, the parts being by weight calculated on the dry content of the components: per 100 parts of component (A) about 50 parts of component (B) and about 60 parts of component (C).

3. A process for dyeing and printing fibrous textile fabric with pigments, which comprises contacting the fabric with an aqueous composition of matter which contains a dispersed pigment and the following compounds as pigment-binders:
    (A) an aqueous dispersion of a copolymer consisting of 60 percent by weight of cyclohexyl acrylate, 35 percent by weight of β-butoxy ethyl acrylate and 5 percent by weight of acrylic acid, and
    (B) an aqueous dispersion of hexamethylolmelamine allyl ether esterified with soya bean fatty acid;

drying the material and heating to harden the composition applied, the components being used in the following proportions, the parts being by weight calculated on the dry content of the components: per 100 parts of component (A) about 100 parts of component (B).

4. A concentrated aqueous composition of matter comprising
    (A) an aqueous dispersion of a copolymer consisting of 60 percent by weight of isobornyl acrylate, 35 percent by weight of β-butoxy ethyl acrylate and 5 percent by weight of acrylic acid, the carboxylic acid groups being neutralized,
    (B) an aqueous dispersion of hexamethylolmelamine allyl ether esterified with soya bean fatty acid, and
    (C) a water-soluble methyl ether of a urea formaldehyde condensation product containing per mol of urea more than 2 mols of formaldehyde, the components being present in the following proportions, the parts being by weight calculated on the dry content of the components: about 50 parts of component (B) and about 60 parts of component (C) per 100 parts of component (A).

5. A concentrated aqueous composition of matter comprising
    (A) an aqueous dispersion of a copolymer consisting of 60 percent by weight of cyclohexyl acrylate, 35 percent by weight of β-butoxy ethyl acrylate and 5 percent by weight of acrylic acid, the carboxylic acid group being neutralized, and
    (B) an aqueous dispersion of hexamethylolmelamine allyl ether esterified with soya bean fatty acid, the components being present in the following proportions, the parts being by weight calculated on the dry content of the components: about 100 parts of component (B) per 100 parts of component (A).

References Cited in the file of this patent

UNITED STATES PATENTS

| | | |
|---|---|---|
| 2,787,603 | Sanders | Apr. 2, 1957 |
| 2,795,564 | Conn et al. | June 11, 1957 |
| 2,918,391 | Hornibrook | Dec. 22, 1959 |